United States Patent [19]
Trovinger

[11] Patent Number: 5,806,413
[45] Date of Patent: Sep. 15, 1998

[54] JUICER

[76] Inventor: Harry R. Trovinger, 1137 Northwood Dr., Lodi, Calif. 95240

[21] Appl. No.: 829,593

[22] Filed: Mar. 31, 1997

[51] Int. Cl.[6] ............................... A23N 1/00; A23N 1/02; A47J 43/046; A47J 43/07

[52] U.S. Cl. ........................... 99/492; 99/510; 241/37.5; 241/92; 366/318; 366/601

[58] Field of Search ............................. 99/495, 509–513, 99/492; 241/37.5, 282.1, 282.2, 199.12, 92; 366/314, 601, 318; 100/117, 145

[56] References Cited

U.S. PATENT DOCUMENTS

| | | |
|---|---|---|
| 2,864,419 | 12/1958 | Woock . |
| 3,976,001 | 8/1976 | Trovinger . |
| 4,691,870 | 9/1987 | Fukunaga et al. ...................... 241/37.5 |
| 5,353,697 | 10/1994 | Ventruati et al. .......................... 99/492 |
| 5,355,784 | 10/1994 | Franklin et al. ........................... 99/492 |
| 5,392,699 | 2/1995 | Tai ............................................. 99/511 |
| 5,417,152 | 5/1995 | Harrison ..................................... 99/492 |
| 5,454,299 | 10/1995 | Gonneaud .............................. 241/92 X |
| 5,495,795 | 3/1996 | Harrison et al. ........................... 99/492 |
| 5,524,530 | 6/1996 | Nijzingh et al. ..................... 366/314 X |

*Primary Examiner*—Timothy F. Simone
*Attorney, Agent, or Firm*—Bernhard Kreten

[57] ABSTRACT

A juicer including a safety switch operatively coupled to an outlet screen holder on a power juicer. The magnet cooperates with a reed switch and a triac to interrupt power unless the screen holder is in place.

20 Claims, 4 Drawing Sheets

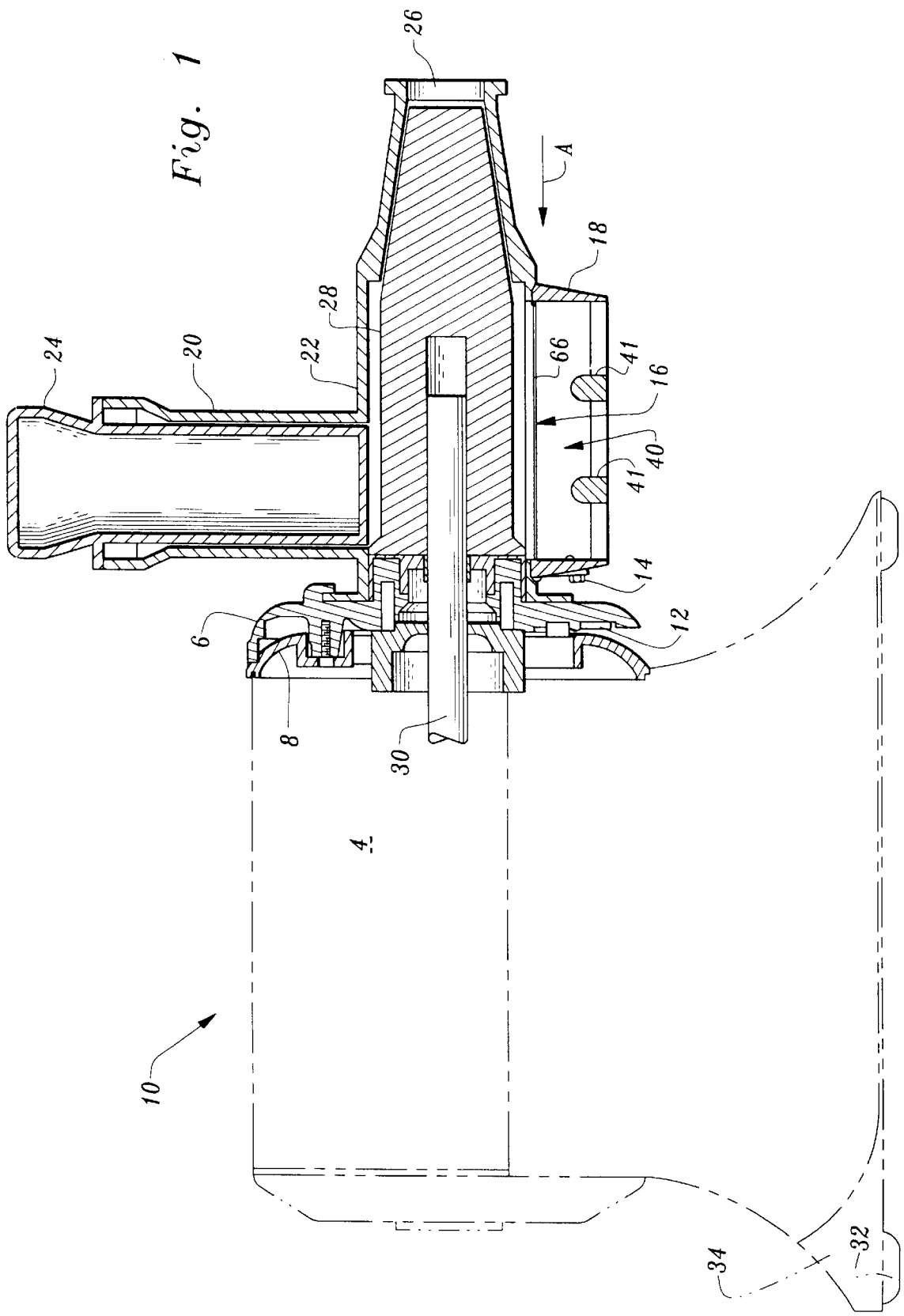

JUICER

FIELD OF THE INVENTION

The following invention relates generally to an apparatus used in the preparation of food stuffs. More specifically, the instant invention is directed to the comminution and liquefaction of comestibles rendering the food stuffs from a solid form to either a liquid or viscous form.

BACKGROUND OF THE INVENTION

The instant invention chronicles further evolution over applicant's U.S. Pat. Nos. 2,864,419 to Woock and 3,976,001 to Trovinger. While each of these patents chronicles the state of the art at the time of those inventions, ongoing research and consumer feedback have led to the subject of the instant invention.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| U.S. PAT. NO. | ISSUE DATE | INVENTOR |
| --- | --- | --- |
| 2,864,419 | December 16, 1958 | Woock |
| 3,976,001 | August 24, 1976 | Trovinger |

SUMMARY OF THE INVENTION

One facet of applicant's contribution over the known prior art involves the utilization of more advanced technology with respect to components which are selectively removable from the juicer apparatus. Heretofore the machine could not be disabled if a critical part were to have been omitted.

For example, when one is juicing, a feeder throat communicating with a juicer body would admit food stuffs to a cutter which would then coact with the food stuffs and either liquefy them or discharge them through an end of the juicer housing as a paste. More specifically, the juicer body is intended to include a sliding screen holder at a bottom area of the juicer body opposite from the top mounted feeding throat. When the holder supports a screen below the cutter, liquid would be dispensed through the screen and into an underlying container. Pulp would be discharged through a discharge end of the juicer body.

On the other hand, should it be desired that the food stuff be rendered into a paste-like form, it is not desirable to separate the juice or oil from the pulp, but rather it is desirable to keep them commingled. In such event, the screen will have been replaced with a plate that blocks the access normally existing through the screen. Thus, the entire food product is discharged through the discharge end of the juicer body. Nut butters can be made this way.

Until now, there was no practical way to disable the machine should the screen holder not be installed on a bottom face of the juicer body. The effect of its omission is that access to the cutter can be afforded where the screen holder would normally be. This, by itself, is not objectionable, but should the user also neglect to put a container for catching the liquid that is generated by the action of the cutter, when the machine is operated, liquid will spill onto a counter surface.

Just having the liquid disposed on a counter surface is a relatively minor annoyance. However, human nature induces a reflexive action in which the user of the machine may attempt to minimize the amount of spillage. The user therefore may reflexively put one's hand adjacent where the screen holder would normally be to "catch" the spill. A possibility therefore exists that one's hand could get too close to the cutter. This is because the screen holder and the clearance that it affords, as well as the barrier through the screen, has not been provided.

The instant invention disables the machine without the screen holder in place.

More particularly, the screen holder carries a magnet on a surface thereof proximate to a bell hub which serves as a cap adjacent one end of a motor which has an output shaft that projects towards the cutter. The bell hub supports a triac and reed switch device which is sensitive to the presence of the magnet and is interposed in the circuit which normally powers the motor. Thus the motor is enabled only when it senses the presence of the magnet and therefore the screen holder. Tolerances are such that the magnet switch system is not easily defeated.

OBJECTS OF THE INVENTION

Accordingly, it is a primary object of the present invention to provide a new and novel juicer.

A further object of the present invention is to provide a device as characterized above which is extremely durable in construction, safe to use and lends itself to mass production techniques.

A further object of the present invention is to provide a device as characterized above in which the motor that powers an output shaft of the juicer which carries the cutter cannot be enabled if a sliding screen holder is missing from the device.

Viewed from a first vantage point, an object of the present invention is to provide a safety device for a power juicer, comprising, in combination: a motor having an output shaft disposed within a housing with an end of the shaft projecting from the housing, the shaft end receiving a cutter for rotation with the shaft, the cutter surrounded by a juicer body which includes a feeding throat, a discharge and a juice outlet, a removable holder extending the juice outlet from the cutter, and means for enabling the motor carried on the holder to prevent motor operation without the holder deployed on the juicer.

Viewed from a second vantage point, an object of the present invention is to provide a safety circuit for a power juicer, comprising, in combination: a power source, a motor disposed in a housing and having a cutter in driving engagement therewith, an on-off switch operatively coupled between the motor and power source, a cutter limited access means coupled to the housing and a safety switch located on the cutter limited access means operatively coupled to the motor to render the motor operative only when the cutter limited access means is deployed on the housing.

These and other objects will be made manifest when considering the following detailed specification when taken in conjunction with the appended drawing figures.

BRIEF DESCRIPTION OF THE DRAWINGS

FIG. 4 is a schematic depiction of the safety device according to the present invention.

DESCRIPTION OF PREFERRED EMBODIMENTS

Figure 2:
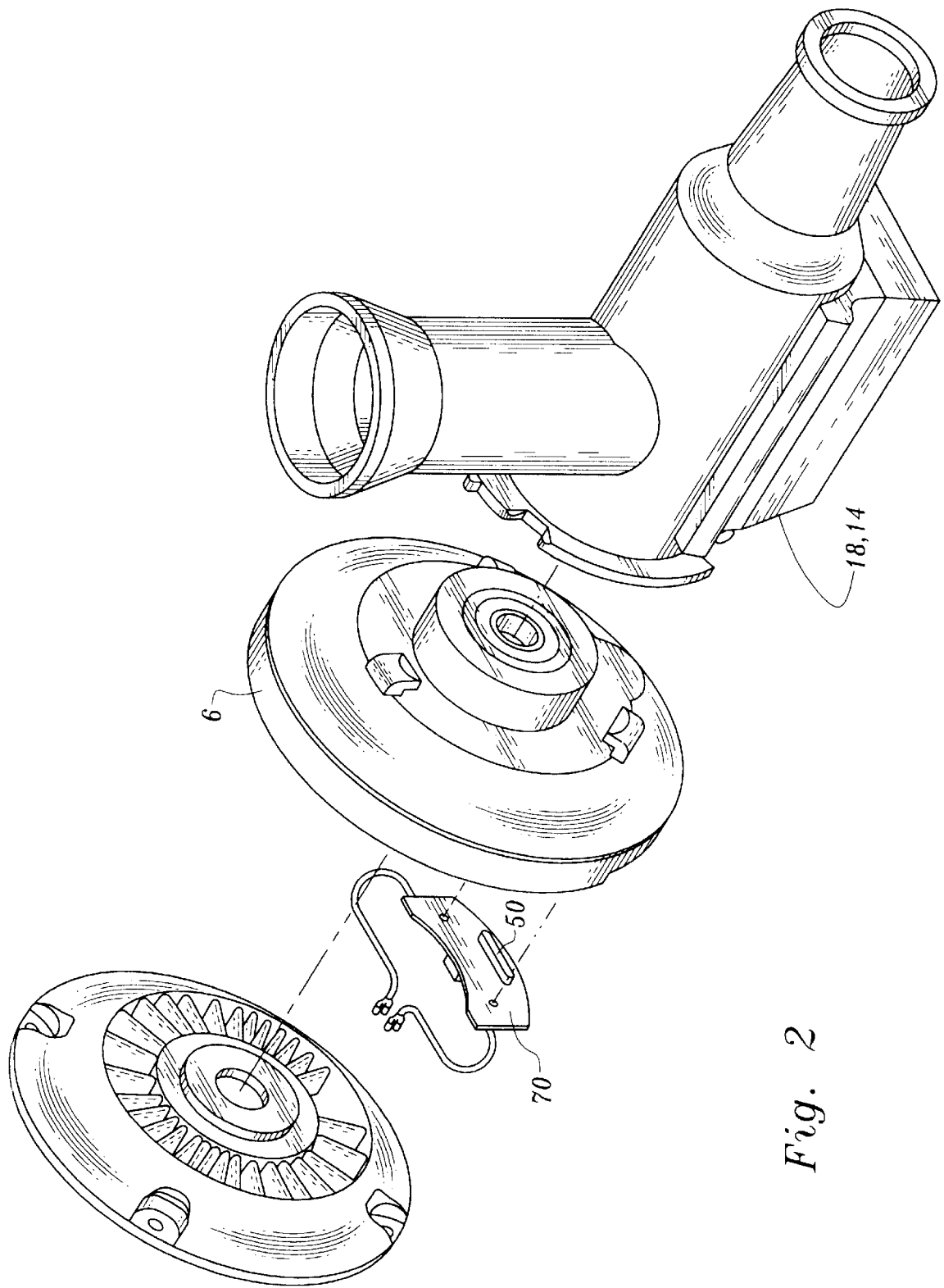
FIG. 2 is an exploded parts perspective view of the sections shown in FIG. 1.

Considering the drawings, wherein like reference numerals denote like parts throughout the various drawing figures, reference numeral 10 is directed to the juicer according to the present invention.

Figure 1:
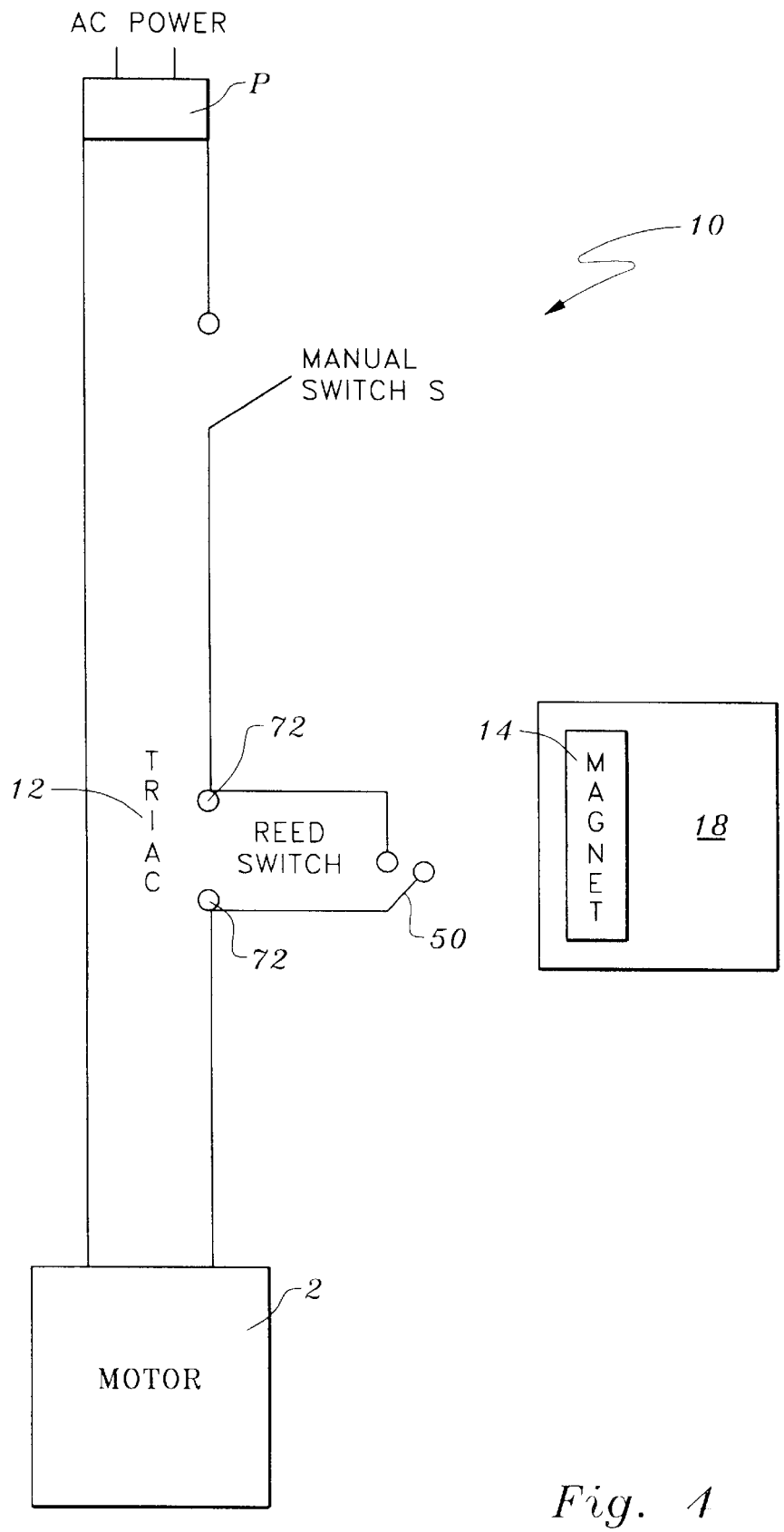
FIG. 1 is a side elevation of the juicer with portions taken in section for clarity.

Referring to FIGS. 1 and 4, in its essence, the juicer 10 includes a motor 2 ensconced within a housing 4 having an output or motor shaft 30 which supports a cutter 28. An end of the motor adjacent the cutter 28 includes a shield 8 which underlies a hub 6 which collectively isolate the interior of the housing 4 from external contamination. The housing 4 includes a base 34 supported on a surface via feet 32.

The output shaft 30 driven by the motor 2 extends from the motor 2, through both the motor and shield 8 end the juicer end bell hub 6 to receive a cutter 28 thereon. The cutter 28 is circumscribed by a juicer body 22. The juicer body 22 includes on a topmost surface thereof, a top mounted inlet feed throat 20 which receives food stuffs therethrough for admission to the cutter 28 for liquefaction and/or comminution. A tamper 24 assists in forcing the food stuffs to the cutter 28.

The body 22 includes an outlet 40 on a bottom side thereof remote from the throat 20. The outlet 40 is protected by either a screen 16 or a non-foraminous plate 16 which blocks this outlet 40 and is held in place by a sliding holder 18. The juicer body 22 includes a discharge end 26 remote from the bell hub 6.

When the screen 16 is in place, liquid will pass through outlet 40 and pulp will exit the discharge end 26. When the screen 16 is replaced with the plate, the food stuffs placed within the throat 20 will come through the discharge end as a paste.

The screen holder 18 has an end 42 adjacent the bell hub 6. That holder end 42 supports a magnet 14. An inside surface of the juicer bell hub 6 supports a triac 12 having quick connect terminals 72. The quick connect terminals 72 of the triac 12 are operatively coupled to the motor 2 and a source of power (FIG. 4) with the source of power interrupted therefrom by a manual switch S and an A/C plug P coupled to power. When the manual switch S is enabled, a voltage will appear across two terminals of the triac 12 operatively coupled between the power and the motor 2. However, current will not flow through the triac 12 until magnetic starter switch or reed switch 50, disposed in parallel with the triac 12, perceives the magnet 18 to be adjacent thereto. Only the magnet 14, when strategically placed adjacent the reed switch 50, will enable the circuit of FIG. 4. The closing of the reed switch 50 included by the magnet 18 allows the voltage to activate the triac 12 which then transmits power directly to the motor in a safe manner.

Figure 3:
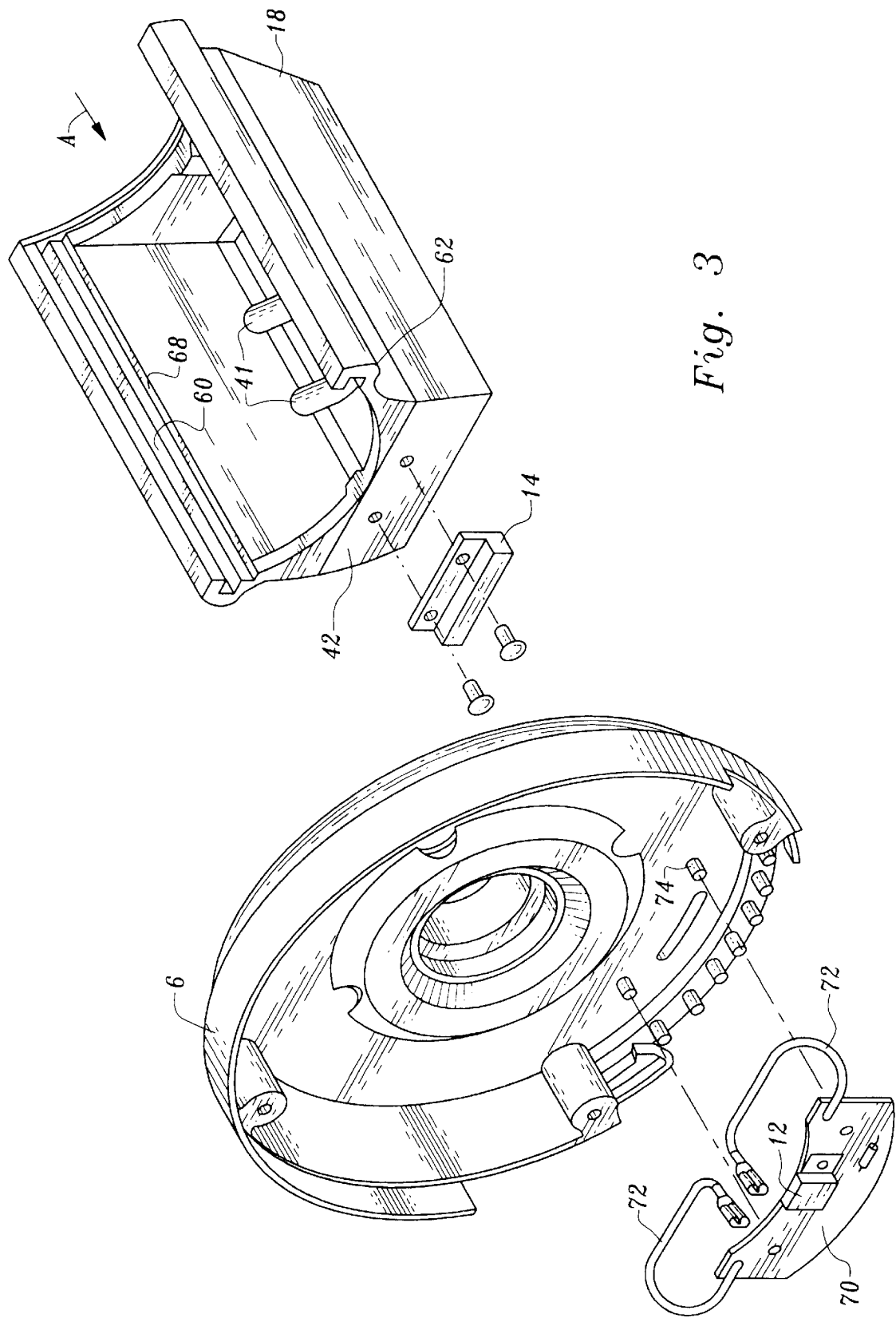
FIG. 3 is a similar perspective view of FIG. 2 taken from a different angle.

The magnet 14, as shown in FIG. 3, is mounted on a face 42 of the sliding screen holder 18 so that it properly addresses the reed switch 50. The sliding screen holder 18 is a substantially four-sided structure having an open top face and open bottom face. The open bottom face can include access inhibiting bars 41, preferably running transverse to the holder's long axis to further preclude access therein. The bars 41 are cylindrical with a flat bottom. The topmost portion of the sliding screen holder includes first and second trackways 60, 62 running parallel to the length of the holder 18. The trackways 60, 62 ride within tracks 66 (FIG. 1) located on both sides of the outlet 40 on the juicer body 22. Motion of the holder 18 in the direction of the arrow A slides the holder 18 onto the juicer body 22 and locates the magnet 14 adjacent the reed switch 50. A shelf 68 disposed below the trackways 60, 62 supports either the screen or plate 16.

FIG. 3 also shows an interior face of the bell hub 6 and the means by which the triac 12 is mounted on the interior face of the bell hub 6. FIG. 2 shows another view of the plate 70 and reflects that the one side of the plate 70 adjacent the bell hub supports the magnetic starter switch, preferably reed switch 50. The FIG. 3 view, showing the triac mounted on an opposite side of the plate 70 includes a pair of leads 72 for coupling into the circuit described above and shown in FIG. 4. The triac 12 is located on the plate 70. Locator posts 74 on an inner face of hub 6 position the triac and magnetic reed 50 precisely to address the magnet 14 carried on the holder 18.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A safety circuit for a power juicer, comprising, in combination:

a power source, a motor disposed in a housing and having a cutter in driving engagement therewith, an on-off switch operatively coupled between said motor and power source, a cutter limited access means coupled to said housing and a non-contact safety switch means located on said cutter limited access means operatively coupled to said motor to render said motor operative only when said cutter limited access means is deployed on said housing.

2. A safety circuit for a power juicer, comprising, in combination:

a power source, a motor disposed in a housing and having a cutter in driving engagement therewith, an on-off switch operatively coupled between said motor and power source, a cutter limited access means coupled to said housing and a safety switch located on said cutter limited access means operatively coupled to said motor to render said motor operative only when said cutter limited access means is deployed on said housing, and wherein said safety switch includes a magnet located on said cutter limited access means strategically oriented to address a magnetically sensitive switch located on a hub fastened to said housing.

3. The circuit of claim 2 including a triac disposed in parallel relationship with said magnetically sensitive switch whereupon closing said magnetically sensitive switch allows voltage to activate said triac and then to power said motor.

4. The circuit of claim 3 wherein said triac is oriented in series with said motor.

5. The circuit of claim 4 wherein said triac and said motor are connected in series to an on/off switch which leads to a source of power.

6. The circuit of claim 5 wherein said magnetically sensitive switch is a reed switch.

7. The circuit of claim 6 wherein said triac is disposed on a plate and said reed switch is disposed on an opposite side of said plate and quick connect terminals extend from said triac to said circuit.

8. The circuit of claim 7 wherein said cutter limited access means includes a juicer body circumscribing said cutter and having a feeding throat at a top portion thereof, a juicer outlet at a bottom portion thereof and a discharge remote from said motor, said juice outlet including a holder upon which said magnet is attached.

9. The circuit of claim 8 wherein said discharge of said holder includes a screen.

10. The circuit of claim 8 wherein said discharge of said holder includes access inhibiting bars running across said holder.

11. A safety device for a power juicer, comprising, in combination:

a motor having an output shaft disposed within a housing with an end of said shaft projecting from said housing, said shaft end receiving a cutter for rotation with said shaft, said cutter surrounded by a juicer body which includes a feeding throat, a discharge and a juice outlet, a removable holder extending said juice outlet from said cutter, and means for enabling said motor carried on said holder to prevent motor operation without said holder deployed on said juicer.

12. The safety device for a power juicer of claim 11 wherein said means for enabling said motor carried on said holder includes a magnet disposed on said holder oriented to address a magnetically sensitive switch disposed in parallel with a triac in a circuit which powers said motor.

13. The safety device for a power juicer of claim 12 wherein magnetically sensitive switch is a reed switch.

14. The safety device for a power juicer of claim 13 wherein said reed switch and triac are disposed on an inner surface of a hub which seals said housing.

15. The circuit of claim 1 wherein said non-contact safety switch means includes a magnet located on said cutter limited access means strategically oriented to address a magnetically sensitive switch located on a hub fastened to said housing.

16. The circuit of claim 1 wherein said cutter limited access means includes a holder and wherein said non-contact safety switch means includes a magnet disposed on said holder oriented to address a magnetically sensitive switch disposed in parallel with a triac in a circuit which powers said motor.

17. The circuit of claim 1 wherein said cutter limited access means includes a juicer body circumscribing said cutter and having a feeding throat at a top portion thereof, a juicer outlet at a bottom portion thereof, and discharge remote from said motor, said juicer outlet including a holder upon which said non-contact safety switch means is attached.

18. The circuit of claim 1 wherein said non-contact safety switch means includes a magnet and a magnetically sensitive switch.

19. The circuit of claim 15 wherein said cutter limited access means includes a holder wherein said holder is made from a substantially non-magnetic material.

20. The circuit of claim 1 wherein said cutter limited access means includes a holder wherein said holder includes access inhibiting bars.

* * * * *